United States Patent [19]
Gabara et al.

[11] Patent Number: 5,757,249
[45] Date of Patent: May 26, 1998

[54] COMMUNICATION SYSTEM HAVING A CLOSED LOOP BUS STRUCTURE

[75] Inventors: Thaddeus John Gabara, Murray Hill, N.J.; Bernard Lee Morris, Emmaus, Pa.

[73] Assignee: Lucent Technologies Inc., Murray Hill, N.J.

[21] Appl. No.: 731,042

[22] Filed: Oct. 8, 1996

[51] Int. Cl.[6] .................. H03H 7/00; H03H 7/48
[52] U.S. Cl. .................. 333/101; 333/124; 326/30; 370/452; 370/460
[58] Field of Search .................. 326/30; 333/101, 333/120, 124, 125, 127, 128, 22 R, 32; 370/419, 452, 460, 463; 375/257

[56] References Cited

U.S. PATENT DOCUMENTS

| | | | |
|---|---|---|---|
| 2,784,381 | 3/1957 | Budenbom | 333/120 |
| 5,194,765 | 3/1993 | Dunlop et al. | 326/87 |
| 5,243,229 | 9/1993 | Gabara et al. | 307/98 |
| 5,298,800 | 3/1994 | Dunlop et al. | 327/108 |
| 5,347,177 | 9/1994 | Lipp | 326/30 |
| 5,528,168 | 6/1996 | Kleveland | 326/30 |

OTHER PUBLICATIONS

H.B. Bakoglu, *Circuits, Inerconnections, and Packaging for VLSI*, Ch. 6, pp. 226–273 (Addison–Wesley Publishing Co. 1990) no month.

"Gunning Transceiver Logic (GTL)—Low-Level, High-Speed Interface Standary for Digital Integrated Circuits", *Electronic Industries Association*, JESD Standard 8-3 (Nov. 1993).

B. Gunning et al. "A CMOS Low-Voltage-Swing Transmission-Line Transceiver", Digest of Technical Papers—*IEEE International Solid-State Circuits Conference*, pp. 58–59 (1992), no month.

*Primary Examiner*—Paul Gensler
*Attorney, Agent, or Firm*—Robert E. Rudnick

[57] ABSTRACT

A communication system having communicating devices coupled to a closed loop bus substantially reduces interconnect distances and corresponding signal propagation delays between the devices. Particular devices possess switchable impedance elements that can be selectively actuated to produce an effective terminating impedance substantially at a midpoint position along the closed loop from the coupling point of a transmission device. In such an arrangement, the produced effective terminating impedance would cause the signal transmitted by the transmission device to propagate to a destination device substantially without signal degradation due to signal reflections.

11 Claims, 2 Drawing Sheets

COMMUNICATION SYSTEM HAVING A CLOSED LOOP BUS STRUCTURE

FIELD OF THE INVENTION

The invention relates to device communication systems.

BACKGROUND OF THE INVENTION

Integrated circuit device arrangements having the ability to provide interdevice communication at higher speeds is an ever present goal for device and system manufacturers. Presently, integrated circuit transistors are capable of providing a switching performance for high speed data transmission that is greater than the ability of common wire interconnects to convey such data between integrated circuit devices. More specifically, the switching performance of metal oxide semiconductor transistors having gate lengths of 1 μm or less can produce data for transmission at rates on the order of 1 Gbit/s which exceeds the capabilities of conventional interconnects, such as dual-in-line packages, stitch-bond wires, and conventional metal traces on printed circuit boards.

For instance, at data rates as low as 100 Mbits/s, discontinuities in the interconnect causes a problem of reflecting a portion of a transmitted data signal back to the transmitting integrated circuit. Such signal reflection often destructively combines with the transmitted signal to degrade the signal received by a destination integrated circuit. Transmission lines have been employed for communication buses in systems to reduce such discontinuities.

In such systems, discrete terminating resistors are often connected to ends of a transmission line bus as shown in FIG. 1. In FIG. 1, six integrated circuit devices 1, 2, 3, 4, 5 and 6 are shown connected by interconnects 30 to a single transmission line bus 10 having terminating resistors 15 and 20 at its ends. The terminating resistors 15 and 20 have impedances that match the transmission line's characteristic impedance $Z_0$ in order to substantially reduce reflections at the transmission line ends that tend to degrade transmitted signals. The use of transmission line structures for interconnects are described in greater detail in H. B. Bakoglu, *Circuits, Interconnections, and Packaging for VLSI*, Ch. 6, pp. 226–273 (Addison-Wesley Publishing Co. 1990), which is incorporated by reference herein.

Another substantial performance limitation in conventional device communication systems has been the signal delay that occurs between communicating devices located at far ends of a lengthy communication bus. In conventional systems, integrated circuit devices, such as processors, connected to a communication bus are also often connected to supporting integrated circuit devices. Typically, such supporting devices must be located in close proximity to the devices they support. For instance, in network servers or parallel processing systems, processors are often connected to memory devices grouped nearby the respective processors. Such arrangements have limited the minimum separation distances between the bus connection positions of adjacently positioned processor devices. Such separation distances, shown by reference x in FIG. 1, have often been on the order of six inches in relatively large network servers.

As a consequence, in the system of FIG. 1, if the connection separation distances are six inches, the distance a signal needs to propagate from device 1 to device 6 would be approximately 30 inches. Since propagation rates of conventional transmission line buses are on the approximate order of 200 ps/in, the corresponding resulting signal delay over the 30 inch distance between device 1 and device 6 would be approximately 6.0 ns. Such delays often have adverse effects on many device based systems including, for example, systems conveying information at data rates of 50 Mbits/s or greater.

Accordingly, there is a recognized need for a device communication technique possessing reduced signal propagation delays.

SUMMARY OF THE INVENTION

The invention is based on the discovery that distances and correspondingly propagation delays between communicating devices coupled to a signal bus can be substantially reduced using a closed loop signal bus. The invention employs switchable impedance elements within particular devices coupled to the bus that can be selectively actuated to produce an effective terminating impedance substantially at a midpoint along the closed loop bus from a coupling point of a transmitting device. In such an arrangement, the produced effective terminating impedance would cause the signal transmitted by the transmitting device to propagate as two signals in the respective clockwise and counter-clockwise directions around the closed loop bus. In this manner, at least one of the signals would reach a destination device substantially without being degraded by undesirable signal reflections.

As a consequence of the closed loop configuration, the substantially furthest distance between any two devices coupled to the closed loop bus tends to be substantially shorter than the comparable conventional open loop bus configuration. For example, the signal propagation distance of 30 inches between the integrated circuits 1 and 6 of the previously described conventional arrangement of FIG. 1 would advantageously be reduced to 18 inches in an arrangement according to the invention with a bus coupling separation distance x of six inches. As a result, the corresponding largest signal propagation delay between communicating devices along the closed loop bus would likewise be substantially reduced from 6.0 ns to a more advantageous approximate 3.6 ns based on a signal propagation rate of 200 ps/in. Moreover, such a reduction in signal propagation delay is achieved with substantially no increase in power dissipation.

In such a system, particular device coupling positions along the closed loop bus and corresponding impedance values of the switchable impedance elements are selected such that the elements can be selectively actuated, individually or in combination, to produce an effective terminating impedance substantially at the midpoint position along the closed loop bus. Such an effective terminating impedance can be produced by the actuation of a single impedance element in a device coupled substantially at the midpoint position. Alternatively, the effective terminating impedance can also be produced by the actuation of a plurality of impedance elements in other devices at other positions having a net effect of causing propagation of a transmitted signal to a destination device substantially as if a single impedance is located at the midpoint position. The invention is particularly useful for interdevice communication at data rates of 50 Mbits/s or greater, however, it is also useful for communicating at lower data rates.

The reduction in signal propagation produced by invention is advantageous for interdevice communication adhering to high speed communication standards including existing standards such as, for example, complementary metal oxide semiconductor (CMOS), emitter-coupled-logic (ECL), transistor-transistor-logic (TTL), Gunning-transceiver-logic (GTL), and pseudo-emitter-coupled-logic (PECL).

Additional features and advantages of the present invention will become more readily apparent from the following detailed description and accompanying drawings.

DETAILED DESCRIPTION

The invention is based on the use of switchable impedance elements in devices coupled to a closed loop transmission line bus to selectively provide an effective terminating impedance at a particular location to enable communications between devices. Such a closed loop configuration substantially reduces the distance between potential communicating devices and correspondingly, reduces signal propagation delays compared to conventional open loop configurations. Moreover, such a reduction in signal propagation delay is achieved with substantially no increase in power dissipation.

In accordance with the invention, the effective terminating impedance is selectively produced substantially at a midpoint along the closed loop bus from a coupling point of a transmission device. Such an effective terminating impedance position causes a signal transmitted on the closed loop bus from the coupling point of the transmission device as two signals in both the clockwise and counter-clockwise directions around the bus. Such an effective terminating impedance further substantially reduces signal reflections on the transmission line that could degrade the signal received by a destination device.

Particular coupling positions of the devices on the closed loop bus and corresponding impedance values of the switchable impedance elements should be used such that the elements can be selectively actuated to produce the effective terminating impedance at the desired position based on the coupling position of the transmitting device. Accordingly, the effective terminating impedance can be produced by the actuation of a single impedance element in a device coupled at a position that is substantially at a midpoint of the closed loop bus from the transmitting device. In addition, the effective terminating impedance can also be produced by the actuation of a impedance elements in a plurality of other devices at other positions along the bus causing the propagation of the transmitted signal to a destination device or devices substantially as if a single terminating impedance element has been coupled at the midpoint position.

Figure 2:
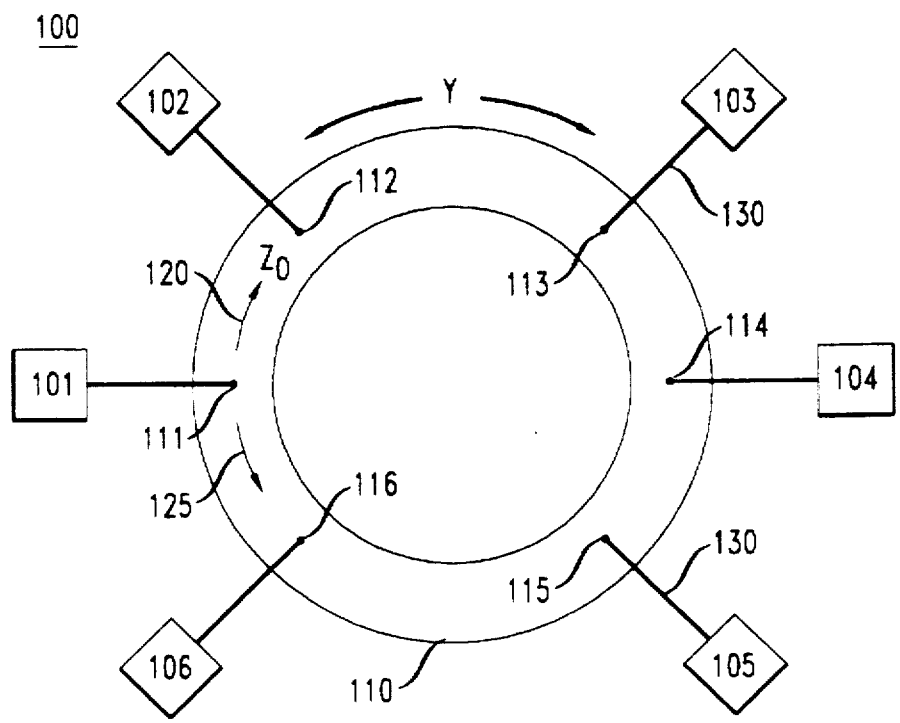
FIG. 2 illustrates a schematic block diagram of an exemplary device arrangement in accordance with the invention using a closed loop bus configuration.
Figure 3:
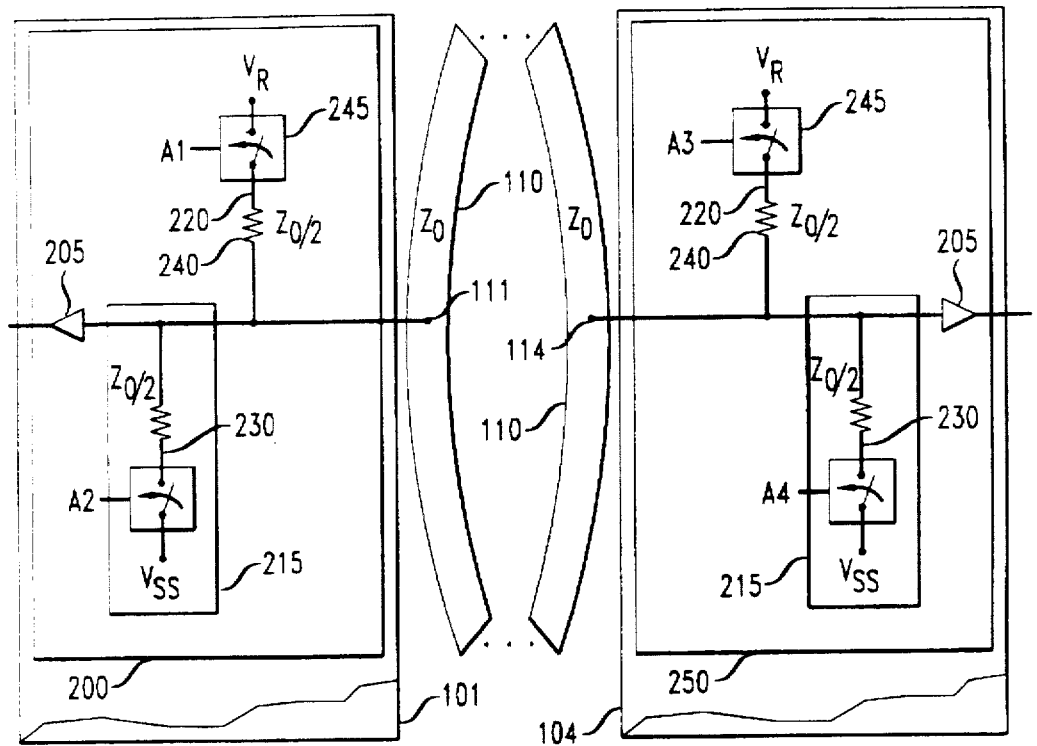
FIG. 3 illustrates a schematic block diagram of input-output sections within two devices of the device arrangement shown in FIG. 2.
Figure 4:
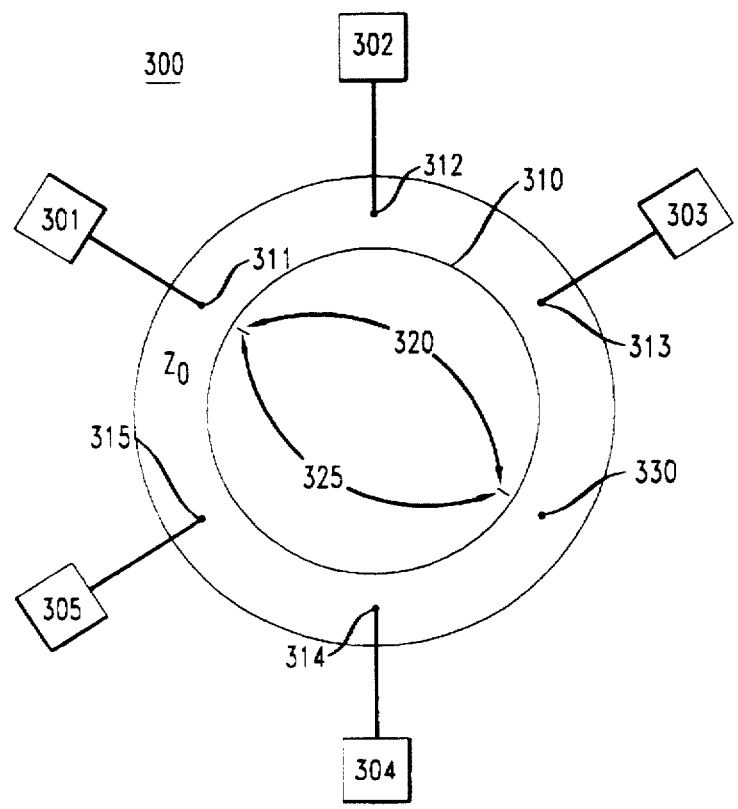
FIG. 4 illustrates a schematic block diagram of an exemplary alternative embodiment of the device arrangement of FIG. 2.

Numerous coupling arrangements employing the closed loop transmission line bus can be used in accordance with the invention. Exemplary configurations of such arrangements are shown in FIGS. 2 and 4 for illustration purposes only and are not meant to be a limitation of the invention. Likewise, numerous device configurations can be employed for providing the switchable impedance element in accordance with the invention. An exemplary switchable impedance element useable in an arrangement according to the invention is shown in FIG. 3 is for illustration purposes only and not meant to be a limitation of the invention.

An exemplary system arrangement 100 in accordance with the invention is shown in FIG. 2. In FIG. 2, six devices 101, 102, 103, 104, 105 and 106 are coupled to a closed loop bus transmission line 110 having a characteristic impedance $Z_0$. The devices 101 through 106 can, for example, be analog or digital integrated circuit devices, discrete processing devices or other components that are capable of transmitting to, or detecting a signal from, a transmission line. As used herein, a transmission line refers to any wiring that can transmit a signal from one point to another, substantially regardless of the ratio of the signal velocity to the signal frequency. The closed loop bus 110 has been shown as substantially circular for ease of illustration purposes and it can have a large variety of other closed loop shapes in accordance with the invention.

The devices 101 through 106 are coupled to the bus 110 at coupling positions 111, 112, 113, 114, 115 and 116, respectively, by interconnects 130. It is possible to use transmission lines for the interconnects 130 with characteristic impedances that correspond to the characteristic impedance $Z_0$ of the bus 110. Separation distances y between adjacent coupling locations and lengths of the interconnects 130 can be based on the physical, thermal or electrical requirements of the components or any supporting devices. It is desirable that the lengths of the interconnects 130 for a transmitting or receiving device substantially not exceed five inches so as not to mitigate the reduction in propagation delay achieved by the closed loop configuration. Accordingly, it is more advantageous to omit an interconnect 130 for a device and directly connect a port of that device to the closed loop bus 110 for improved performance.

The devices 101 through 106 are organized as respective pairs such that the devices in each pair have corresponding coupling locations 111 through 116 that are substantially at midpoints along the closed loop transmission line 110 from one another. The device pairs shown in FIG. 2 include devices 101 and 104, devices 102 and 105, and devices 103 and 106. For the device pair of devices 101 and 104, the corresponding coupling locations 111 and 114 are substantially at midpoints locations from one another along the closed loop bus 110. In other words, the length of the transmission line bus between the coupling locations 111 and 114 in the clockwise or counter-clockwise direction around the closed loop bus 110 is substantially equal.

Each device 101 through 106 possesses respective switchable impedance elements that can be selectively controlled to provide a terminating impedance. Exemplary switchable impedance elements are described below with regard to FIG. 3. Referring to FIG. 2, a device in a particular device pair provides its terminating impedance to its interconnect 130 when the other device in its device pair is transmitting a signal on the bus 110. Control circuits for instructing a device to provide its terminating impedance can be located within the devices 101 to 106 or in an external controller (not shown).

In an exemplary operation of the device 101 transmitting a signal to any of the of the coupled devices 102 through 106, the device 104 couples an impedance to its interconnect 130 to provide an effective terminating impedance at the coupling location 114. As a consequence of the terminating impedance, the signal transmitted by the device 101 would propagate on the closed transmission line 110 in both the clockwise and counterclockwise direction as shown by arrows 120 and 125. Since the two portions of the closed loop bus 110 that extends between coupling locations 111 and 114 have characteristic impedances of $Z_0$, the closed loop bus 110 operates as a parallel combination of two impedances of $Z_0$ between such coupling locations. Such a parallel combination acts as an equivalent circuit having an impedance of $Z_0/2$ for the propagation of signal energy. Accordingly, an advantageous terminating impedance for such a combination is an impedance of $Z_0/2$ in the device 104 to substantially reduce any signal reflections or destructive combination of the clockwise and counter-clockwise signal propagations.

As a consequence of employing the closed loop configuration, the distance over the transmission line 110 for which a signal transmitted by the device 101 must propagate to a destination device is the distance y for destination devices 102 or 106, or the distance2y for destination devices 103 or 105, or the distance 3y for the destination device 104. In contrast, in the conventional six device system of FIG. 1, the propagation distances between device 1, and 2, 3, 4, 5 and 6 are the distances x, 2x, 3x, 4x and 5x, respectively. Such propagation distances do not include the lengths of interconnects 30 and 130 from the devices to the respective transmission lines 10 and 110 in FIGS. 1 and 2.

Figure 1:
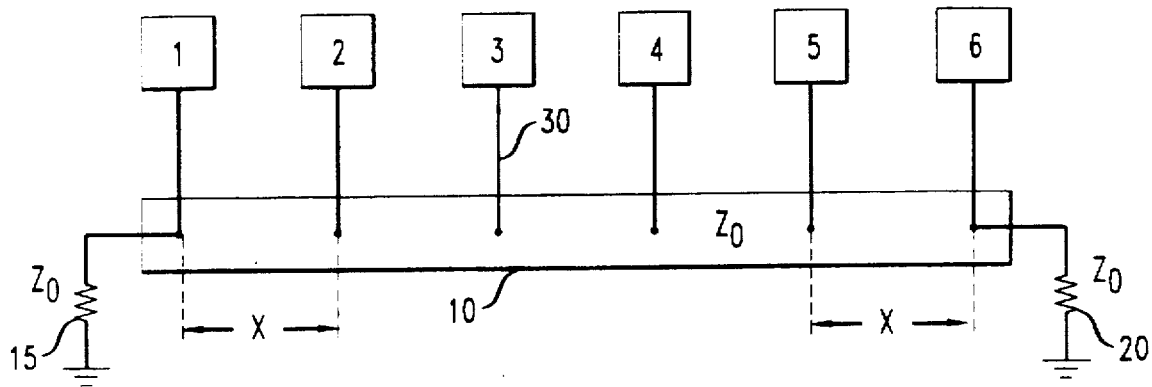
FIG. 1 is a schematic block diagram of a device arrangement using a conventional open loop bus configuration.

Thus, if the coupling separation distance y of FIG. 2 is substantially equal to the separation distance x of FIG. 1, then the furthest propagating distance of the arrangement in FIG. 1 is 5x between devices 1 and 6, and the corresponding furthest propagating distance of the arrangement 100 in FIG.2 is 3x between devices 101 and 104. The other propagation distances according to the invention in FIG. 2 are generally shorter than the majority of propagation distances required in the comparable conventional open loop transmission line system of FIG. 1. It is recognized that for uniform coupling separations along the bus that as the number of devices coupled to the bus increases, the furthest propagations distances of a closed loop bus according to the invention approach approximately one-half of the furthest propagations distances of the comparable conventional open loop configuration. The corresponding reduction in signal propagation delays according to the invention can advantageously be achieved with substantially no increase in power dissipation.

The system arrangement 100 of FIG. 2 employs coupling locations that are uniformly spaced by the distance y for ease of illustration only and it should be readily understood that uniformly spacing is not required between adjacent coupling locations in accordance with the invention. It is possible to employ non-uniform spacing between adjacent coupling locations according to the invention while still maintaining device pairing. Also, not all devices coupled to the bus need be part of device pairs. Accordingly, such devices need not contain switchable terminating impedances. Thus, although an even number of devices are shown, it is also possible to employ an odd number of devices in accordance with this embodiment of the invention.

More detailed views of input-output sections 200 and 250 in the devices 101 and 104 in the arrangement 100 of FIG. 2 are illustrated in FIG. 3. In FIGS. 2 and 3, similar components are like numbered for ease of illustration, for example, the devices 101 and 104 and the closed loop signal bus 110. Only those particular portions of the closed loop bus 110 that are coupled to the devices 101 and 104 have been shown for ease of illustration. It is possible for the configurations of the input-output sections of the devices 102, 103, 105 and 106 to be similar to the sections 200 and 250 of the devices 101 and 104, shown in FIG. 3.

The illustrated arrangement in FIG. 3 is operable to transmit first or second signal levels in accordance with the Gunning-transceiver-logic (GTL) standard. The GTL standard is described in greater detail in "Gunning Transceiver Logic (GTL) - Low-Level, High-Speed Interface Standard for Digital Integrated Circuits", *Electronic Industries Association*, JESD Standard 8-3 (November 1993), which is incorporated by reference herein. Although the arrangement in FIG. 3 transmits communication signals in accordance with the GTL standard, it should be readily understood that a device arrangement according to the invention can be employed to transmit and receive signals according to other standards, such as, example, complementary metal oxide semiconductor (CMOS), transistor-transistor-logic (TTL), Gunning-transceiver-logic plus, emitter-coupled-logic (ECL), and pseudo-emitter-coupled-logic (PECL).

The use of a single port in the input-output sections 200 and 250 for communicating over the single bus 110 are for illustration purpose only. It should be readily understood that systems according to the invention may typically employ input-output sections having a greater number of input-output ports coupled to a like number of signal buses. Moreover, it is possible for the devices 101 and 104 to be disposed on a substrate, such as for example, a printed circuit board or multidevice module, which also maintains the structure of the signal bus 110.

Each of the input-output sections 200 and 250 can include an input buffer 205, at least one switchable impedance element 220 and a signal driver 215 coupled to an interface 103 that is connected to the interconnect 130. As used herein, interface 103 refers generally to an electrically-conducting element that enables coupling of the element 220 and driver 215 to the signal bus 110. It is possible for the interface 103 to be a metal trace. Exemplary configurations for the input buffer 205 include those configurations typical employed within conventional integrated circuit. Such input buffers are described in greater detail in B. Gunning et al. "A CMOS Low-Voltage-Swing Transmission-Line Transceiver, *Digest of Technical Papers—IEEE International Solid-State Circuits Conference*, pp. 58–59 (1992), which is incorporated by reference herein.

The switchable impedance element 220 is coupled between power supply $V_R$ and the interface 103. The switchable impedance element 220 should be switchable to provide a terminating impedance value, such as for example an impedance of $Z_0/2$ between the power supply $V_R$ and the interface 103. The impedance element 220 should also be switchable to provide an open circuit between the respective power supply and the interface 103. The particular voltage magnitude provided by the power supply $V_R$ is described in greater detail below.

Thus, the switchable impedance element 220 is schematically represented by impedance element 240 connected to switch 245. In the exemplary embodiment shown in FIG. 3, the impedance elements can be activated to provide the impedance $Z_0/2$ between the respective components based on control signals A1 and A3 for the ports 200 and 250, respectively. Accordingly, it is possible to employ an on-chip impedance element such as, for example, a resistor, resistor-inductor combination, and/or a resistor-capacitor combination for the impedance element 240, and a switch, such as a conventional integrated circuit transistor switch, for the switch 245.

Other integrated circuit configurations can be employed for the switchable impedance element 220 including, for example, other passive element configurations as well as active impedance elements that are capable of performing both the switching function and providing the desired impedance value, such as the active resistive devices described in U.S. Pat. Nos. 5,194,765, 5,243,229 and 5,298,800, which are assigned to the assignee of this invention and which are incorporated by reference herein. Such active impedance elements can be employed individually, or in a parallel, cascaded or series configuration to provide the desired switchable impedance value. The switchable impedance element 220 of the devices 101 and 104 produces the effective terminating impedances at the desired locations along the closed loop bus 110 in accordance with the invention when the other one of the devices 104 and 101, respectively, is transmitting a signal. Accordingly, the input-output sections 200 and 250 of the devices 101 and 104 employ the signal drivers 215 for transmitting signals. However, if a device only receives and does not transmit signals, then the signal driver 215 can be omitted from such a device in an arrangement according to the invention.

An exemplary configuration for the signal driver 215 is shown in FIG. 3. However, the particular configuration for the signal driver 215 is not critical to practicing the invention and other signal driver configurations are useable according to the invention for producing the desired signal levels on the bus 110. The depicted configuration for the signal driver 215 includes a switchable impedance element 230 disposed between the interface 103 and power supply Vss. It is possible for the components of the switchable impedance element 230 to be substantially similar to those previously described with respect to the switchable impedance element 220. Control signals A2 and A4 control the coupling of an impedance value between the respective power supply and the interface 103 for the ports 200 and 250, respectively. Each impedance element 230 is also switchable to provide an open circuit between the respective power supply and interface 103.

The power provided by the power supplies $V_{SS}$ and $V_R$ and impedance values for the impedance elements 230 should be selected based on the desired first and second signal levels to be transmitted on the bus line 110. It is possible for the second power supply $V_{SS}$ to be the device ground of the respective device 101 and 104. As a consequence, an impedance value of substantially $Z_0/4$ and a voltage $V_R$ substantially of 1.2 V is suitable for providing first and second signal levels of 0.4 V and 1.2 V to the bus 110 in accordance with the GTL standard.

In operation, each port 200 or 250 can be configured to perform any of the following functions: 1) provide the terminating impedance, 2) transmit a signal at a first or second signal level, 3) receive a signal and provide the terminating impedance, or 4) receive a signal while another device coupled to the bus 110 provides the terminating impedance. More specifically, each port 200 or 250 can be configured to provide the terminating impedance of $Z_0/2$ by activating the impedance element 220 while deactivating the element 230. This same configuration is employed when the port 200 or 250 receives a signal and provides the terminating impedance. The ports 200 or 250 can be configured to transmit a communication signal at a first or second signal level by activating or deactivating the impedance element 230, respectively. Each port 200 or 250 can also deactivate the impedances elements 220 and 230 to receive a signal while another device provides the terminating impedance.

Thus, in order for the device 101 to transmit a communication signal to any of the devices 102 through 106, shown in FIG. 2, the port 250 of device 104 is configured in its terminating impedance configuration and the port 200 of device 101 is configured in either its transmit-first or -second signal level configurations. Likewise, the devices 101 through 103, 105 and 106 can receive a signal from the device 104 by configuring the port 200 to provide the terminating impedance and the port 250 in either its transmit-first or -second signal level configurations to transmit a corresponding signal.

It is possible for the devices 101 and 104 to communicate with one another to alert the other that it is going to transmit a communication signal such that the other device can implement the terminating impedance configuration. Alternatively, a controller, processor or line arbitrator separate from the devices 101 and 106 can control the providing of the desired terminating impedance according to the invention, and correspondingly, which devices can transmit signals over the line 110.

Although the first and second signal levels are achieved in the exemplary configuration in FIG. 3 using a single switchable impedance element 230 for the signal driver 215, it is possible to employ two switchable impedance elements between the interface 103 and one or two power supplies for achieving the desired first and second signal levels. The switchable impedance element can also provide respective power divider configurations between the signal bus and the two power supplies to produce and transmit corresponding data signals of particular signal levels on the signal bus. Moreover, multi-level signals can be provided by the signal driver in a similar manner.

The coupling positions 111 through 116 of the respective device pairs 101 and 104, 102 and 105, and 103 and 106, are illustrated at exact midpoints along the bus 110 for ease of illustration purposes. However, such coupling positions need only be at substantially midpoints according to the invention. More specifically, the coupling positions can vary from the exact midpoint along the bus 110 from a transmission device according to the invention as long as the corresponding degradation in transmitted signal quality does not adversely effect detection by a destination device.

FIG. 4 illustrates an arrangement 300 according to the invention for producing the effective terminating impedance as a net effective terminating impedance using a plurality of switchable impedance elements within a like plurality of devices along the closed loop bus 310. In FIG. 4, the arrangement 300 includes five devices 301, 302, 303, 304 and 305 coupled to a closed loop bus 310 at respective locations 311, 312, 313, 314 and 315. The devices 301 through 305 are substantially similar to the devices 101 through 106 of FIG. 2 and include respective switchable impedance elements such as, for example, the elements 220 illustrated in FIG. 3. However, none of the coupling locations 311 through 315 in FIG. 4 are in positions that are substantially at the midpoint along the bus 310 from a possible transmission device.

Accordingly, the devices 301 through 305 can not individually be used to provide a single terminating impedance at the desired location as is used in the arrangement 100 of FIG. 2. The arrangement 300 of FIG. 4 employs the actuation of switchable impedance elements in a plurality of devices to provide a like plurality of particular impedance's to the closed loop bus 310 at different positions. The particular devices providing such impedances and the particular impedances values used should cause a signal to propagate on the closed loop bus 310 from the transmission device to an intended destination device substantially as if a single terminating impedance had been provided at the midpoint along the bus 310 from a transmission device.

Such a relationship is referred to as producing an effective terminating impedance of $Z_0/2$ at such a location.

An exemplary method for providing the effective terminating impedance of $Z_0/2$ at the midpoint is to actuate respective switchable impedance elements in a plurality of devices so as to produce first and second effective impedances of $Z_0$ at substantially symmetrical, e.g., mirrored, positions along the respective halves of the bus 310 between the transmission device and the midpoint along the bus 310 from that transmission device. In this manner, the symmetrical first and second effective impedances of $Z_0$ produce a corresponding circuit equivalent of a net effective terminating impedance of substantially $Z_0/2$ at the midpoint along the bus from the transmission device.

Thus, for example, if the separation distances between the coupling locations 311 through 315 was six inches, then when the device 301 transmits a signal, it is possible for the devices 303 and 304 to provide respective impedances of $Z_0$ to produce the effective impedance of $Z_0/2$ at a midpoint location 330 along the bus 310 from the transmission device 301. The devices 303 and 304 are coupled at respective symmetrical locations 313 and 314 along respective halves 320 and 325 of the bus 310 defined between the transmission device 301 and a midpoint 330 along the bus 310 from the coupling location 311 of the device 301.

Although the devices 303 and 304 are coupled at respective symmetrical locations 313 and 314 on the respective bus halves 320 and 325, it is also possible to actuate the impedance elements of devices 302 and 305 coupled at the symmetrical positions 312 and 315 to achieve substantially similar results. Moreover, it is further possible to actuate impedance elements of more than one device coupled on each of the respective bus halves 320 and 325 to produce the desired net effective terminating impedance of $Z_0/2$ at the midpoint 330.

The position 330 of the produced effective terminating impedance is illustrated at the exact midpoint along the bus 310 for ease of illustration purposes. However, such effective terminating impedance need only be substantially at the midpoint according to the invention. More specifically, the effective terminating impedance position can vary from the exact midpoint along the bus 310 from a transmission device according to the invention as long as the corresponding degradation in transmitted signal quality does not adversely effect detection by a destination device. Likewise, although the positions 313 and 314 of the produced effective impedances of $Z_0$ are illustrated as exact symmetrical positions, it is possible for such positions to vary from these exact positions as long as the corresponding degradation in transmitted signal quality does not adversely effect detection by a destination device.

The system arrangement 300 of FIG. 4 employs coupling locations that are uniformly spaced for ease of illustration and it is also possible to employ non-uniform spacing between such coupling locations. However, in accordance with this embodiment of the invention, the devices with switchable impedance elements and the values of such impedances should be selected such that the desired effective terminating impedance is produced substantially at a midpoint along the bus from a transmission device. Although an odd number of devices are shown, it should be readily understood that an even number of devices can also be employed in accordance with this embodiment of the invention.

Moreover, a switchable impedance element of a single device can be used in producing the effective terminating impedances for different transmission devices according to this embodiment of the invention. In a similar manner, a device can employ a plurality of switchable impedance elements that can be actuated individually and/or in combination for providing different impedance values to produce the effective terminating impedances for different transmission devices. Such a device configuration can also be used to provide both a switchable terminating impedance for a first transmission device in the manner previously described with respect to FIG. 2, as well as another impedance value that is used to produce an effective terminating impedance for a second transmission device.

Although several embodiments of the invention have been described in detail above, many modifications can be made without departing from the teaching thereof. All of such modifications are intended to be encompassed within the following claims. For example, although the previously described embodiments transmit communication signals in accordance with the GTL standard, it should be readily understood that a device arrangement according to the invention can be employed to transmit and receive signals according to other standards, such as, example, Gunning-transceiver logic plus, complementary metal oxide semiconductor (CMOS), transistor-transistor-logic (TTL), emitter-coupled-logic (ECL), and pseudo-emitter-coupled-logic (PECL). Also, such device arrangements need not conform to conventional standards or otherwise. The invention is particularly useful for interdevice communication at data rates of 50 Mbits/s or greater, however, it is also useful for communicating at lower data rates.

The invention claimed is:

1. An arrangement of devices comprising:
   a closed loop signal bus;
   a plurality of devices coupled to said bus, at least one of said devices being a transmission device for transmitting signals over said bus to at least one other of said devices; and
   at least two other of said devices being coupled at respective positions along said closed loop bus, said at least two other devices including respective switchable impedance elements, said switchable impedance elements being actuatable to provide respective impedances on said bus that in combination produce an effective terminating impedance substantially at a midpoint along said closed loop bus from said transmission device for a signal transmitted by said transmission device.

2. The arrangement of claim 1 wherein said other devices are two devices coupled at substantially symmetrical positions along respective halves of said bus defined by said coupling position of said transmission device and said corresponding midpoint, and wherein said two devices have switchable impedance elements of substantially $Z_0$.

3. The arrangement of claim 1 wherein said switchable impedance element is an impedance element coupled to a switch.

4. The arrangement of claim 1 wherein said transmission device is capable of transmitting a signal in accordance with Gunning-transceiver-logic standard.

5. The arrangement of claim 1 wherein said devices are integrated circuit devices.

6. The arrangement of claim 1 wherein at least one of said devices is coupled to said bus by a transmission line interconnect.

7. The arrangement of claim 1 wherein at least one of said devices is directly connected to said bus.

8. The arrangement of claim 1 wherein said closed loop bus is formed on, and said devices are mounted to, a single substrate.

9. A method for communication between a plurality of devices coupled to a closed loop bus comprising:

actuating switchable impedance elements in at least two other devices coupled at respective positions on said bus to provide respective impedances to said bus that in combination produce an effective terminating impedance substantially at a midpoint along said closed loop bus from a coupling position of a transmission device; and transmitting a signal on said bus by said transmission device to a destination device.

10. The method of claim 9 wherein said other devices are two devices coupled at substantially symmetrical positions along respective halves of said bus defined by said coupling position of said transmission device and said corresponding midpoint and wherein said step of actuating said switchable impedance elements of said other devices produces first and second effective impedances of substantially $Z_0$ at said substantially symmetrical positions.

11. The method of claim 9 wherein said transmitted signal is in accordance with Gunning-transceiver-logic standard.

* * * * *